United States Patent
Kamvysselis et al.

(10) Patent No.: US 6,553,464 B1
(45) Date of Patent: Apr. 22, 2003

(54) OBTAINING DATA FROM A REMOTE STORAGE DEVICE

(75) Inventors: Peter Kamvysselis, Boston, MA (US); Dan Arnon, Boston, MA (US); David Meiri, Boston, MA (US); Mark J. Halstead, Waltham, MA (US)

(73) Assignee: EMC Corporation, Hopkinton, MA (US)

( * ) Notice: Subject to any disclaimer, the term of this patent is extended or adjusted under 35 U.S.C. 154(b) by 70 days.

(21) Appl. No.: 09/801,252

(22) Filed: Mar. 7, 2001

Related U.S. Application Data

(60) Provisional application No. 60/273,790, filed on Mar. 4, 2001.

(51) Int. Cl.$^7$ .............................................. G06F 15/16
(52) U.S. Cl. ....................... 711/148; 709/217; 709/218; 709/219; 709/227; 709/278; 709/229; 711/114; 711/118; 711/137; 711/147; 711/150
(58) Field of Search ................................ 709/217–219, 709/227–230; 711/114, 137, 118, 147, 152, 148

(56) References Cited

U.S. PATENT DOCUMENTS

| | | | |
|---|---|---|---|
| 5,206,939 A | 4/1993 | Yanai et al. | 711/4 |
| 5,778,394 A | 7/1998 | Galtzur et al. | 707/205 |
| 5,845,147 A * | 12/1998 | Vishlitzky et al. | 710/5 |
| 5,857,208 A | 1/1999 | Ofek | 707/204 |
| 6,052,797 A * | 4/2000 | Ofek et al. | 709/219 |
| 6,253,292 B1 * | 6/2001 | Jhang et al. | 709/218 |
| 6,321,308 B1 * | 11/2001 | Arnon et al. | 710/112 |

* cited by examiner

Primary Examiner—Than Nguyen
(74) Attorney, Agent, or Firm—Choate, Hall & Stewart

(57) ABSTRACT

Providing data from a volume of a remote storage device coupled to a local storage device that is coupled to a host, includes providing a command to the remote storage device to request the data, if the data is stored in a cache portion of the remote storage device, the remote storage device providing the data, and if the data is not stored in the cache portion of the remote storage device, the remote storage device causing the data to be fetched from the volume and returning one of: a disconnect or an indicator that the data was not found. Causing the data to be fetched from the volume may include creating a separate wait task that waits for the data to be fetched from the volume. The separate wait task may be created only if there is not already another wait task waiting for the same data. The wait task may post an error if the data is not fetched after a predetermined amount of time, such as four seconds. An error may be posted if the data is not fetched after a predetermined amount of time, such as eight seconds. After the data has been fetched from the volume, the remote storage device may provide a reconnect command followed by the data.

45 Claims, 7 Drawing Sheets

OBTAINING DATA FROM A REMOTE STORAGE DEVICE

CROSS REFERENCE TO RELATED APPLICATIONS

This application claims priority to U.S. provisional patent application no. 60/273,790, filed on Mar. 4, 2001.

BACKGROUND OF THE INVENTION

1. Technical Field

This application relates to computer storage devices, and more particularly to communication between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a user may denote a first storage device as a master storage device and a second storage device as a slave storage device. Other incarnations of RDF may be provide a peer to peer relationship between the local and remote storage devices. The interacts directly with the local storage device, but any data changes made to the local storage device are automatically provided to a remote storage device using RDF. The local and remote storage devices may be connected by a data link, such as an ESCON link. The RDF functionality may be facilitated with an RDF adapter (RA) provided at each of the storage devices.

In some instances, it may be desirable for the host to be able to verify that the data stored on the remote storage device is consistent with the data stored on the local storage device. However, doing so may be difficult if there may be no convenient mechanism for the host to efficiently examine data on the remote storage device to compare the local data with the data stored on the remote storage device. Thus, it would be useful to have a mechanism for conveniently obtaining the-data from the remote storage device in order to perform the comparison.

SUMMARY OF THE INVENTION

According to the present invention, providing data from a volume of a remote storage device coupled to a local storage device that is coupled to a host, includes providing a command to the remote storage device to request the data, if the data is stored in a cache portion of the remote storage device, the remote storage device providing the data, and if the data is not stored in the cache portion of the remote storage device, the remote storage device causing the data to be fetched from the volume and returning one of: a disconnect or an indicator that the data was not found. Causing the data to be fetched from the volume may include providing a request for the data on a queue that is serviced by a disk adapter corresponding to the volume. The data may be provided from the remote storage device to the local storage device. The local storage device may provide the data to the host. Providing a command to the remote storage device may include transmitting a command from the local storage device to the remote storage device. Prior to the local storage device providing the command to the remote storage device, the host may provide the command to the local storage device. Causing the data to be fetched from the volume may include creating a separate wait task that waits for the data to be fetched from the volume. The separate wait task may be created only if there is not already another wait task waiting for the same data. The wait task may post an error if the data is not fetched after a predetermined amount of time, such as four seconds. An error may be posted if the data is not fetched after a predetermined amount of time, such as eight seconds. After the data has been fetched from the volume, the remote storage device may provide a reconnect command followed by the data. In response to the data being in the cache portion of the remote storage device, the cache portion may be locked prior to transferring data therefrom. Following locking the cache portion, the data may be retested to determine if the data is still stored in the cache portion and, in response to retesting indicating that the data is not in the cache portion, the remote storage device may unlock the cache portion and then cause the data to be fetched from the volume and return one of: a disconnect or an indicator that the data was not found. Following transferring the data from the cache portion, the cache portion may be unlocked.

According further to the present invention, retrieving data includes providing a command to a remote storage device containing the data and receiving one of: the data or an indicator that the data is not available, where, following receipt of the indicator, data becomes available at the remote storage device after an amount of time that corresponds to retrieving the data from a disk of the storage device. The indicator may include a disconnect or a data_not_found message. The remote storage device may retrieve data by providing a request for the data on a queue that is serviced by a disk adapter corresponding to the disk. Providing a command to a remote storage device may include providing the command to a local storage device and the local storage device providing the command to the remote storage device. Retrieving data may also include, in response to the data not being available in cache memory of the remote storage device, causing the data to be fetched from the disk. Causing the data to be fetched from the disk may include providing a request for the data on a queue that is serviced by a disk adapter corresponding to the disk. Causing the data to be fetched from the disk may include creating a separate wait task that waits for the data to be fetched from the disk. The separate wait task may be created only if there is not already another wait task waiting for the same data. The wait task may post an error if the data is not fetched after a predetermined amount of time, such as four seconds. An error may be posted if the data is not fetched after a predetermined amount of time, such as eight seconds. Retrieving data may also include, after the data has been fetched from the disk, the remote storage device providing a reconnect command followed by the data. Retrieving data may also include, in response to the data being in the cache portion of the remote storage device, locking the cache portion prior to transferring data therefrom. Retrieving data may also include, following locking the cache portion, retesting to determine if the data is still stored in the cache portion and, in response to retesting indicating that the data is not in the cache portion, the remote storage device unlocking the cache portion and then causing the data to be fetched from the disk and returning one of: a disconnect or an indicator that the data was not found. Retrieving data may also include following transferring the data from the cache portion, unlocking the cache portion.

According further to the present invention, computer software that provides data from a volume of a remote storage device, includes executable code that receives a command sent to the remote storage device to request the data, executable code that provides the data if the data is stored in a cache portion of the remote storage device, and executable code that causes the data to be fetched from the volume and returns one of: a disconnect or an indicator that the data was not found if the data is not stored in the cache portion of the remote storage device. Executable code that causes the data to be fetched from the volume may include executable code that provides a request for the data on a queue that is serviced by a disk adapter corresponding to the volume. Executable code that causes the data to be fetched from the volume may include executable code that creates a separate wait task that waits for the data to be fetched from the volume. The separate wait task may be created only if there is not already another wait task waiting for the same data. The wait task may post an error if the data is not fetched after a predetermined amount of time, such as four seconds. An error may be posted if the data is not fetched after a predetermined amount of time, such as eight seconds. The computer software may also include executable code that provides a reconnect command followed by the data after the data has been fetched from the volume. The computer software may also include executable code that locks the cache portion prior to transferring data therefrom in response to the data being in the cache portion of the remote storage device. The computer software may also include executable code that retests to determine if the data is still stored in the cache portion following locking the cache portion and executable code that unlocks the cache portion, causes the data to be fetched from the volume, and returns one of: a disconnect or an indicator that the data was not found in response to retesting indicating that the data is not in the cache portion. The computer software may also include executable code that unlocks the cache portion following transferring the data from the cache portion.

According further to the present invention, a remote storage device includes a disk, a cache memory in communication with the disk, means for receiving requests for data stored on the disk, means for providing requested data if the requested data is also stored in the cache memory, and means for causing the data to be fetched from the disk and providing one of: a disconnect or an indicator that the data is not found if the requested data is not stored in the cache memory. Means for causing the data to be fetched from the disk may include means for providing a request for the data on a queue that is serviced by a disk adapter corresponding to the disk. The data may be provided from the remote storage device to a local storage device. The data may be provided to a host. Means for causing the data to be fetched from the disk may includes means for creating a separate wait task that waits for the data to be fetched from the disk. The separate wait task may be created only if there is not already another wait task waiting for the same data. The wait task may post an error if the data is not fetched after a predetermined amount of time, such as four seconds. An error may be posted if the data is not fetched after a predetermined amount of time, such as eight seconds. The remote storage device may also include means for providing a reconnect command followed by the data after the data has been fetched from the disk. The remote storage device may also include means for locking the cache memory prior to transferring data therefrom in response to the data being in the cache memory. The remote storage device may also include means for retesting to determine if the data is still stored in the cache memory following locking the cache memory and means for unlocking the cache memory and then causing the data to be fetched from the disk and returning one of: a disconnect or an indicator that the data was not found in response to retesting indicating that the data is not in the cache memory. The remote storage device may also include means for unlocking the cache memory following transferring the data from the cache memory.

DETAILED DESCRIPTION OF VARIOUS EMBODIMENTS

Figure 1:
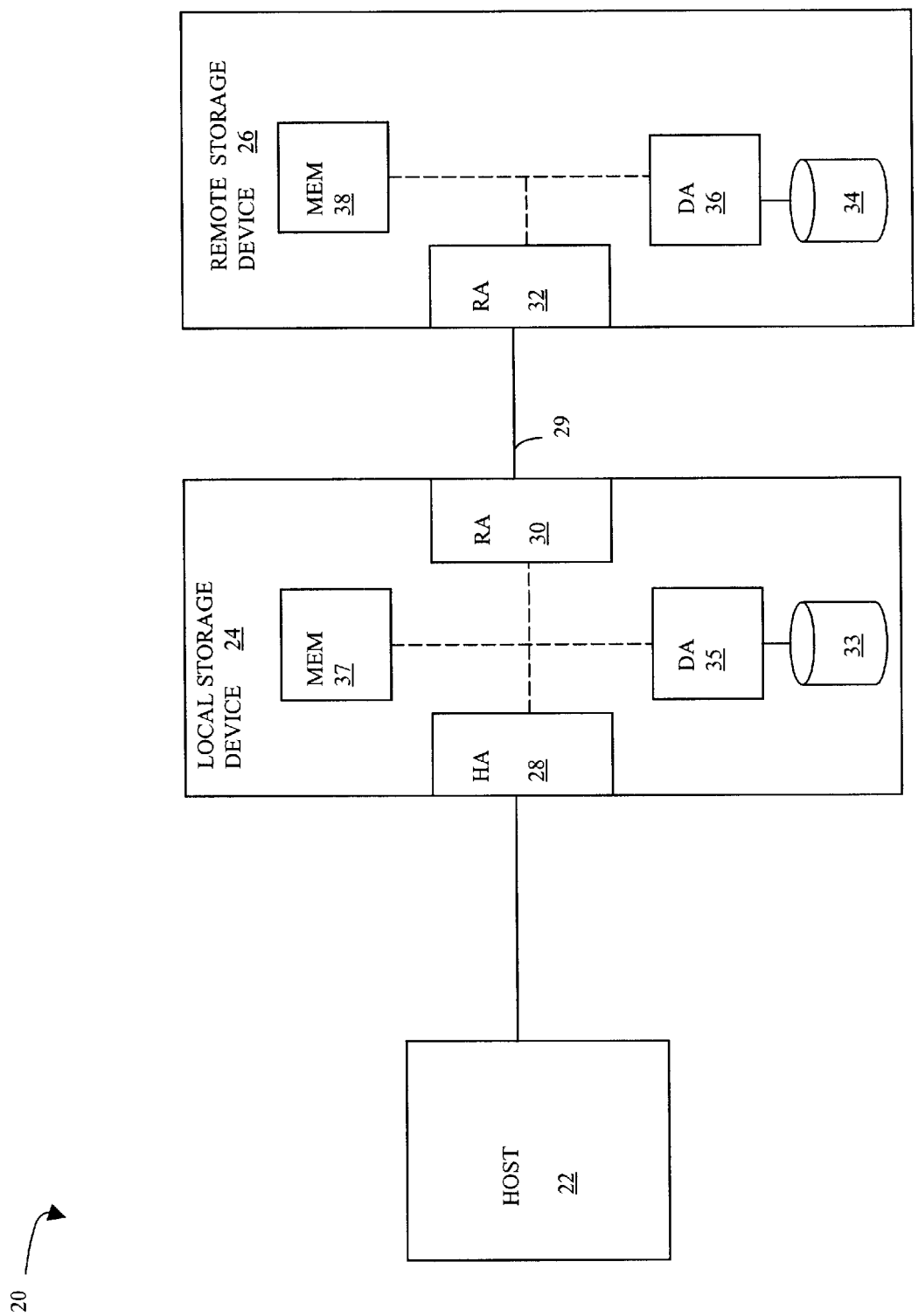
FIG. 1 is a schematic diagram showing a host, a local storage device, and a remote data storage device used in connection with the system described herein.

Referring to FIG. 1, a diagram 20 shows a relationship between a host 22, a local storage device 24 and a remote storage device 26. The host 22 reads and writes data from and to the local storage device 24 via a host adapter 28, which facilitates the interface between the host 22 and the local storage device 24. Data from the local storage device 24 is copied to the remote storage device 26 via an RDF link 29 to cause the data on the remote storage device 26 identical to the data on the local storage device 24. Note that there may be a time delay between the transfer of data from the local storage device 24 to the remote storage device 26 so that the remote storage device 26 may, at certain points in time, contain data that is not identical to the data on the local storage device 24.

The local storage device 24 includes an RDF adapter unit (RA) 30 and the remote storage device 26 includes an RA 32. The RA's 30, 32 are coupled to the RDF link 29 and are similar to the host adapter 28, but are used to transfer data between the storage devices 24, 26. The software used in connection with the RA's 30, 32 is discussed in more detail hereinafter.

The storage devices 24, 26 may include one or more volumes, each containing a different portion of data stored on each of the storage devices 24, 26. FIG. 1 shows the storage device 24 including a volume 33 and the storage device 26 including a volume 34. The RDF functionality described herein may be applied so that the data on the volume 33 of the local storage device 24 is copied, using RDF, to the volume 34 of the remote storage device 26. It is possible that other data of the storage devices 24, 26 is not copied between the storage devices 24, 26 and thus is not identical.

The volume 33 is coupled to a disk adapter unit (DA) 35 that provides data to the volume 33 and receives data from the volume 33. Similarly, a DA 36 of the remote storage device 26 is used to provide data to the volume 34 and receive data from the volume 34. A data path exists between the DA 35, the HA 28 and RA 30 of the local storage device 24. Similarly, a data path exists between the DA 36 and the RA 32 of the remote storage device 26.

The local storage device 24 also includes a memory 37 that may be used to facilitate data transferred between the DA 35, the HA 28 and the RA 30. The memory 37 may contain parameters from system calls, tasks that are to be performed by one or more of the DA 35, the HA 28 and the RA 30, and a cache for data fetched from the volume 33. Similarly, the remote storage device 26 includes a memory 38 that may contain parameters from system calls, tasks that are to be performed by one or more of the DA 36 and the RA 32, and a cache for data fetched from the volume 34. Use of the memories 37, 38 is described in more detail hereinafter.

If the RDF is running properly, then, at steady state, the data on the volume 34 of the remote storage device 26 will be identical to the data on the volume 33 of the local storage device 24. However, it is useful for the host 22 to be able to confirm that this is true by obtaining data from the volume 34 of the remote storage device 26, obtaining data from the volume 34 of the local storage device 24, and then comparing the data to confirm that it is identical. This may be performed in a test that is part of a test suite that may be run periodically (e.g., daily). Such test suites include the ADIOS test suite and the STCMON test suite, provided by EMC Corporation of Hopkinton, Mass.

Figure 2:
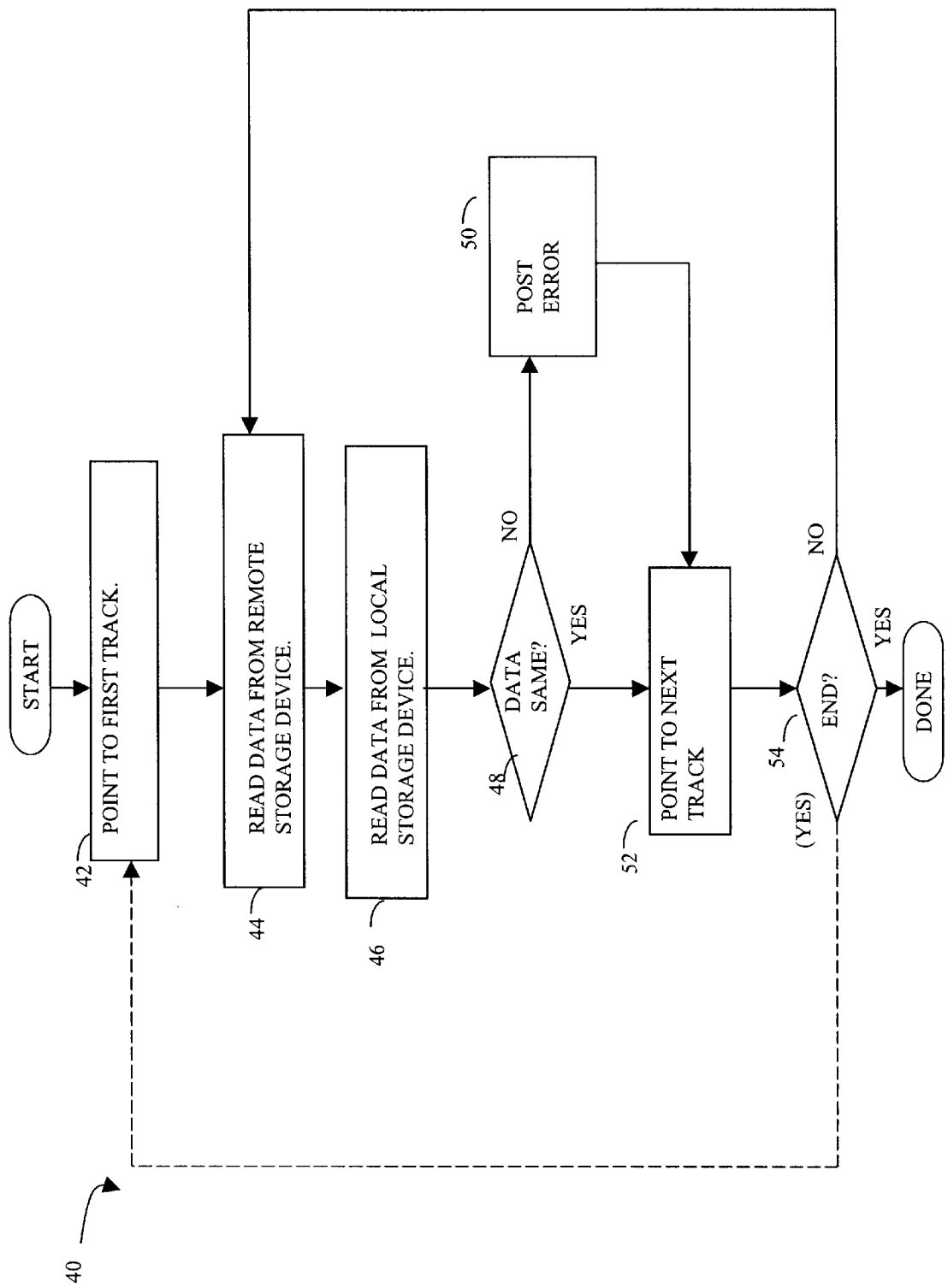
FIG. 2 is a flowchart illustrating steps performed by a program on the host to compare data on the local storage device with data stored on the remote storage device in connection with the system described herein.

Referring to FIG. 2, a flowchart 40 illustrates steps performed by a program that may be run in the host 22 to verify that the data on the volume 34 of the remote storage device 26 is identical to data on the volume 34 of the local storage device 24. In some embodiments, the program illustrated by the flowchart 40 may be run only when the local storage device 24 and remote storage device 26 are taken offline to perform tests (i.e., not in production). Alternatively, the tests may be performed by reserving exclusive use for volumes under test while the affected storage devices remain in production. For example, the volumes 33, 34 may be compared by reserving the volumes 33, 34 for exclusive use while the storage devices 24, 26 remain in production and handle data for other volumes thereof.

Processing begins at a first step 42 where the first track (or a first portion) of the volumes 33, 34 is selected. The different track numbers refer to corresponding track numbers of both the volumes 33, 34. As discussed herein, a comparison is made by comparing a particular track of the volume 33 of the local storage device 24 with a corresponding track of the volume 34 of the remote storage device 26.

Following the step 42 is a step 44 where the track on the volume 34 of the remote storage device 26 is read. The host 22 reads a particular track on the volume 34 of the remote storage device 26 by making a system call through the local storage device 24 that is passed to the remote storage device 26. The system call is transmitted from the RA 30 to the RA 32 via the RDF link 29 and returns data (via the RDF link 29) from the remote storage device 26 through the local storage device 24 to the host 22. Processing at the step 44 is described in more detail hereinafter.

Following the step 44 is a step 46 where the corresponding track on the volume 33 of the local storage device 24 is read. Following step 46 is a test step 48 where it is determined whether the data is the same. If not, then an error has occurred and control transfers from the step 48 to a step 50 where error processing occurs. The error processing may include, for example, posting the error in an appropriate location and/or providing a message to a user indicating the error and providing additional information, such as the track number, to the user.

If it is determined at the test step 48 that the data for a track (or some other portions of the volumes 33, 34) on the local storage device 24 and the remote storage device 26 is the same, then control passes from the test step 48 to a step 52 where the next track of the volumes 33, 34 is selected for comparison. Note that the step 52 may also be reached following the step 50. Following step 52 is a test step 54 where it is determined if the end has been reached. That is, at the test step 54 it is determined if the mechanism used for pointing to tracks points beyond the last track (or portion) of the volumes 33, 34. If it is determined at the test step 54 that it is not the end, then control passes from the step 54 back to the step 44. Otherwise, processing is complete.

Alternatively, if it is desirable to rerun the comparison program, then, once the track pointer points beyond the last track (or portion) of the volumes 33, 34 at the test step 54, control passes from the step 54 back to the step 42, as illustrated by an alternative path 56.

Note that in some embodiments, the program illustrated by the flowchart 40 may only be performed when the track table indicates that there are no invalid tracks on either of the volumes 33, 34, where invalid tracks are used to indicate that RDF has not yet updated the data for the volume 34 with data that has changed on the volume 33. Alternatively, the program illustrated by the flowchart 40 may be performed when invalid tracks are present by simply skipping comparison of the invalid tracks. In that case, the step 48 would include a test for whether the track being examined is an invalid track and, if so, control would pass from the step 48 to the step 52 so that error processing does not occur.

Figure 3:
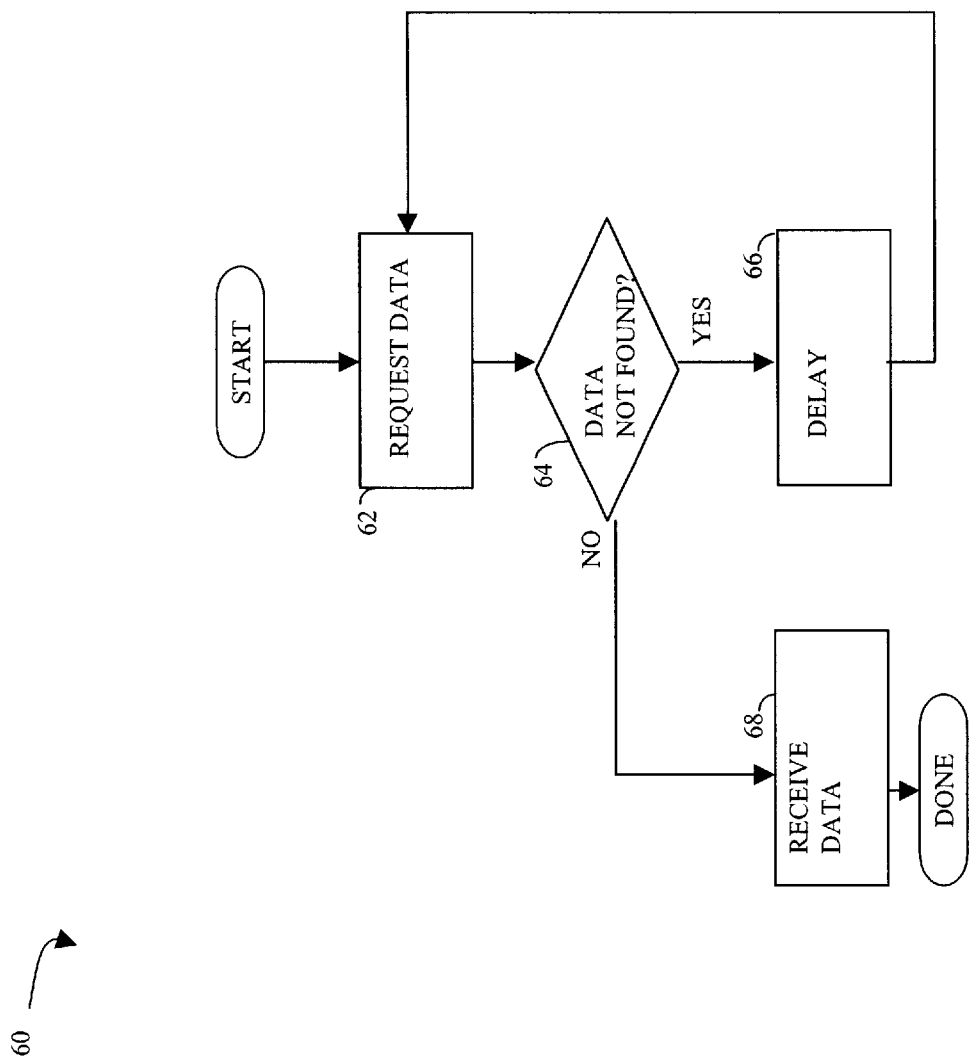
FIG. 3 is a flowchart illustrating steps performed in connection with reading data from a remote storage device.

Referring to FIG. 3, a flowchart 60 illustrates in more detail processing performed in connection with reading data on the volume 34 of the remote storage device 26 at the step 44 of the flowchart 40. Processing begins at a first step 62 where the host sends a read data system call (via the HA 28) to request the data from the remote storage device 26. Following step 62 is a test step 64 to determine if a data_not_found error has been returned. As explained in more detail elsewhere herein, the remote storage device 26 returning a data_not_found error does not necessarily mean that the data is not on the remote storage device 26.

If it is determined at the test step 64 that the data_not_found error has been returned, then control passes from the test step 64 to a step 66 where a delay occurs. The time for the delay is set according to a plurality of functional parameters that will become apparent in connection with the discussion herein. In one embodiment, the delay is 100 milliseconds, although other values for the delay may be appropriate in different situations. Following the delay at the step 66, control passes back to the step 62 to request the data again. As discussed elsewhere herein, it is possible that a second or subsequent request at the step 62 will result in the data being provided by the remote storage device 26.

If it is determined at the test step 64 that the data_not_ found error has not been returned, then control passes from the step 64 to a step 68 where the data that is provided by the remote storage device 26 is received. Following the step 68, processing is complete. Note that any other errors that may be returned by the RA 32 are not specifically discussed herein, but may be handled in a conventional manner apparent to one of ordinary skill in the art. Further note that it may be possible to read data from multiple tracks simultaneously so that, for example, the host 22 would make a single request for each of tracks 1–N and then would make subsequent request for data from those tracks. As will be apparent from the remainder of the discussion herein, it is more likely that data will be returned on second and subsequent requests for particular data than on a first request for the data.

Figure 4:
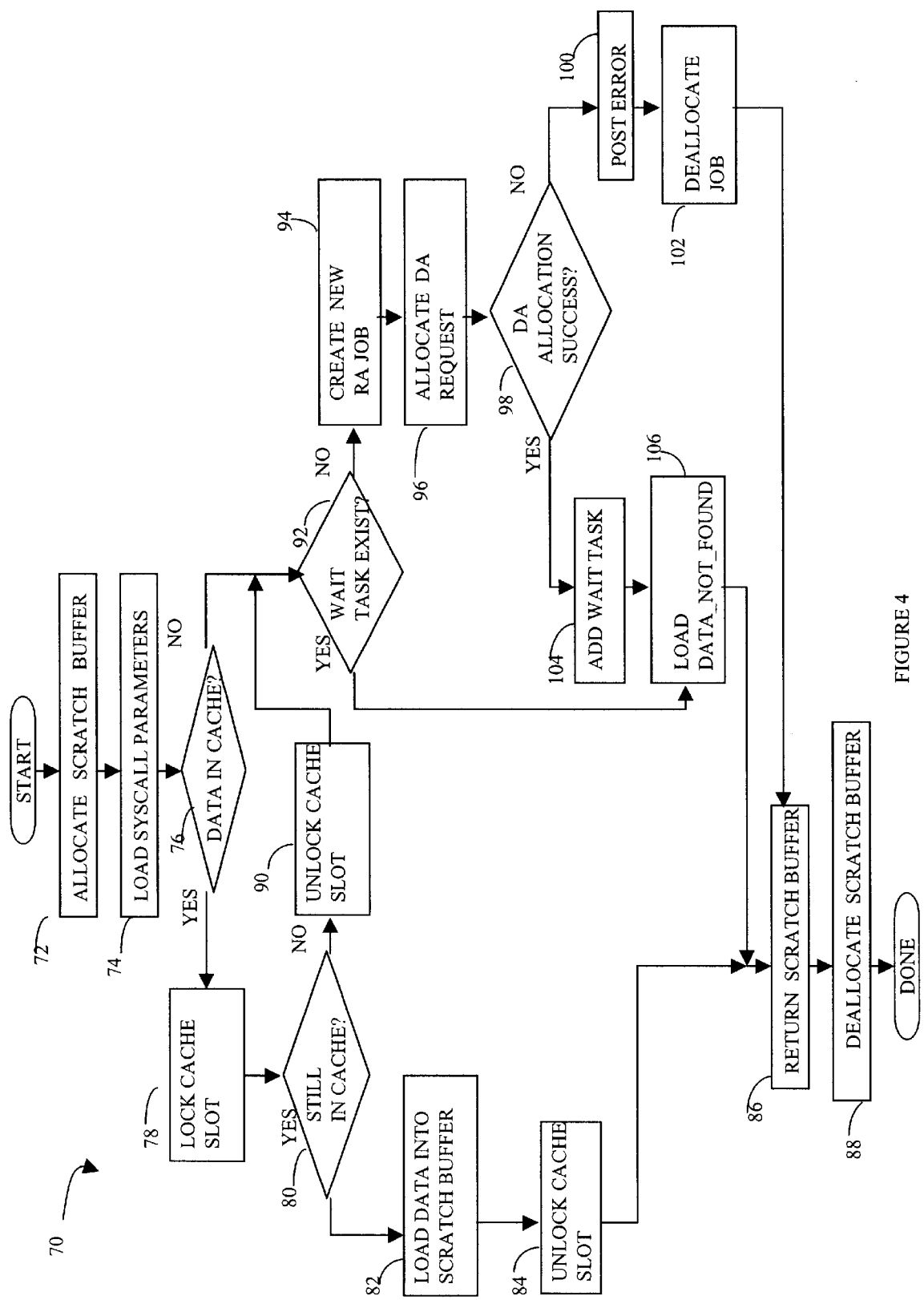
FIG. 4 is a flowchart illustrating steps performed by software running on a remote RA in connection with an embodiment of the system described herein.

Referring to FIG. 4, a flowchart 70 illustrates steps performed by the software of the RA 32 of the remote storage device 26 in response to receipt of a data request system call from the local storage device 24 via the RDF link 29. Processing begins at a first step 72 where a scratch buffer is allocated in the memory 38. The scratch buffer may be used to store parameters from the system call, including parameters provided with the system call as well as any data that is returned in connection with servicing the system call. Following the step 72 is a step 74 where the system call parameters provided by the RA 30 are loaded into the scratch buffer.

Following the step 74 is a test step 76 where it is determined if the requested data is already in the cache portion of the memory 38 of the remote storage device 26. The data may already be in the cache portion of the memory 38 due to, for example, a previous request for the same data. If it is determined at the test step 76 that the data is in the cache, then control passes from the step 76 to a step 78 where the cache slot corresponding to the data is locked. Locking the cache slot prevents the data from being removed from the cache. The data remains in the cache until after the slot is unlocked.

Following the step 78 is a step 80 where it is determined if the requested data is still in the cache. Since the system described herein runs in a multitasking environment, it is possible that the data could have been removed from the cache, by another task, in between the test step 76 and the step 78 where the cache slot was locked. If it is determined at the test step 80 that the data is still in the cache, then control transfers from the step 80 to a step 82 where the data from the cache is loaded into the scratch buffer that was allocated at the step 72. Following the step 82 is a step 84 where the cache is unlocked.

Following step 84 is a step 86 where the data (including any appropriate system parameters) is returned to the local storage device using the RA's 30, 32 and the RDF link 29. Following step 86 is a step 88 where the scratch buffer allocated at the step 72 is deallocated. Following step 88, processing is complete.

If it is determined at the step 80 that the data is not still in the cache after locking the slot at the step 78, then control transfers from the step 80 to a step 90 where the cache slot is unlocked. Following the step 90 is a test step 92. The step 92 is also reached if it is determined at the test step 76 that the data is not in cache. At the step 92, it is determined if a wait task already exists. As discussed in more detail below, a wait task is used to request data from the volume 34 via the disk adapter 36. The wait task waits for the data to be provided from the volume 34. Note that requesting data from the volume 34 will cause the data to be available in the cache once the request has been serviced. The data would then be available in the cache for subsequent read request.

If it is determined at the test step 92 that there is no other wait task waiting for the data, the control transfers from step 92 to step 94 were a new RA job is created. The RA job is a data structure that is stored locally on the RA 32 and contains information such as the various tasks associated with the job. Following the step 92 is a step 94 where a DA request is allocated on a DA request queue that is stored in the memory 38. A DA request is provided to request the data. The DA 36 (and perhaps other DA's) service the queue by reviewing the requests and performing the services indicated thereby. For the step 96, a request is allocated on the DA queue to request the data from the volume 34 corresponding to the data requested by the system call made to the remote storage device 26.

Following the step 96 is a test step 98 where it is determined is the DA request allocation at the step 96 was successful. If not, then control transfers from the step 98 to a step 100 where an error is posted in a manner similar to that discussed above in connection with other errors. Following the step 100 is a step 102 where the job, created at the step 94, is deallocated. Following the step 102, control transfers to the step 86 where the scratch buffer is returned followed by the step 88, where the scratch buffer is deallocated. Following the step 88, processing is complete. The steps 86, 88 are discussed above.

If it is determined at the step 98 that allocation of the DA request at the step 98 was successful, then control transfers from the step 98 to a step 104 where a wait task is added. The purpose of the wait task is to wait until the DA request allocated at the step 96 is serviced. The wait task is discussed in more detail hereinafter. Following the step 104 is a step 106 where a data_not_found indicator is loaded into the scratch buffer that was allocated at the step 72. The data_ not_found indicator is returned by the remote storage device 26 to the local storage device 24 to indicate that the requested data is not being returned. However, as discussed in more detail elsewhere herein, subsequent requests for the data made by the local storage device 24 to the remote storage device 26 are designed to return the data once it has been loaded in the cache portion of the memory 38.

Note that the step 106 is also reached if it is determined at the test step 92 that a wait task exists. The test step 92 is used to ensure that only one wait task per data request is created. Note that if it is determined at the step 92 that a wait task exists, control transfers from the step 92 to the step 106 to place the data_not_found indicator in the scratch buffer, followed by the steps 86, 88 where the data is returned via the RDF link 29 and the scratch buffer is deallocated, as discussed above. Thus, the step 92 is designed to insure that only one wait task is created per data request. Accordingly, a first data request for particular data will result in the step 104 being executed to create the wait task while subsequent requests for the same data that occur before the data is loaded into the cache portion of the memory 38 will cause control to flow from the step 92 to the step 106, omitting the step 104. Following the step 106 are the steps 86, 88, discussed above, where the scratch buffer is returned and then deallocated.

The purpose of the wait task is to request the data from the volume 34. The wait task waits until the data request is fulfilled, and then deallocates the corresponding job and DA request in the queue. Once the data request has been fulfilled, the data will have been read from the volume 34 into the cache portion of the memory 38 using the caching mechanism of the storage device 26. Thus, once the data is in the cache portion of the memory 38, subsequent requests for the data will result in the test step 76 determining that the data is in cache followed by processing where the data is returned from the remote storage 26 to the local storage device 24 via the RDF link 29.

Figure 5:
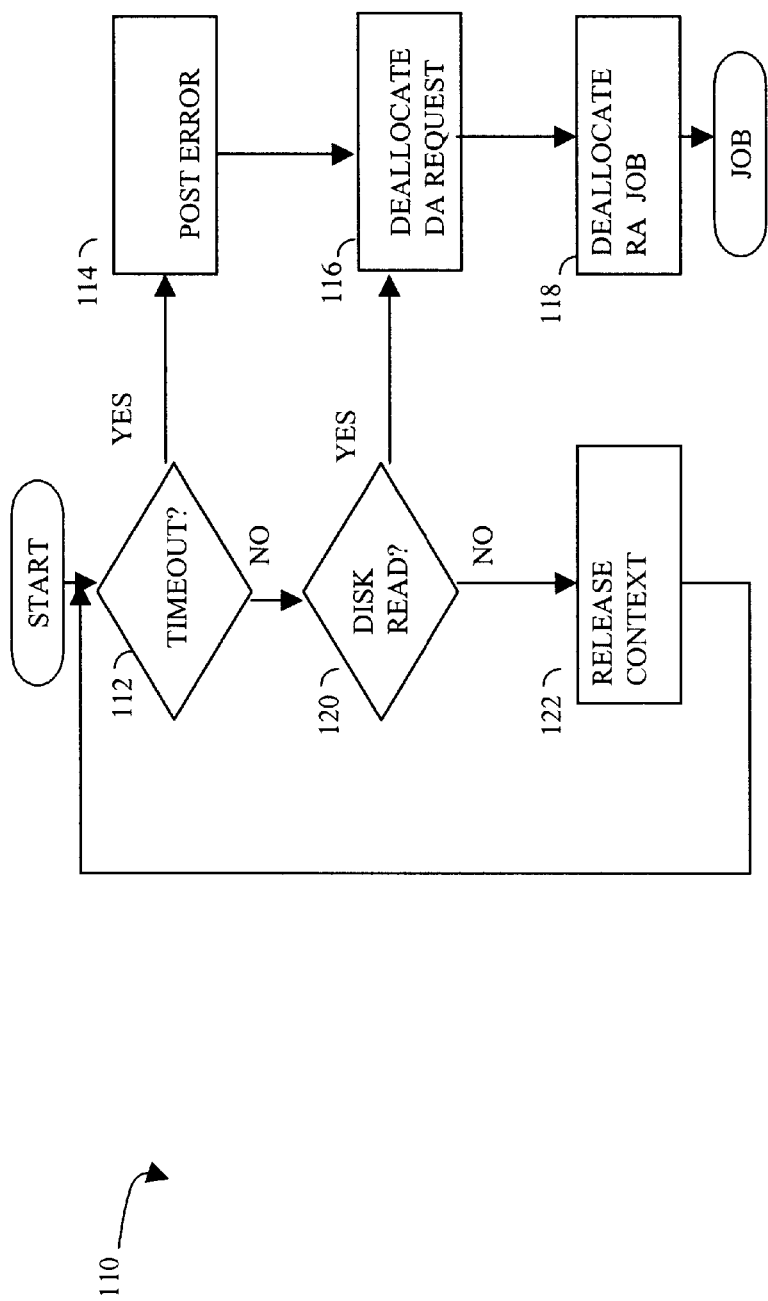
FIG. 5 is a flowchart illustrating steps performed by a wait task running on a remote RA in connection with an embodiment of the system described herein.

Referring to FIG. 5, a flowchart 100 illustrates steps performed in connection with the wait task that is created at the step 86 discussed above in connection with the FIG. 4. Processing begins at a test step 112 which determines if a time out has occurred. If too much time has passed since the wait task was created, then a time out occurs. In some embodiments, the predetermined amount of time is four seconds, although other times may be used. If it is determined at the test step 112 that a time out has occurred, then control passes from the step 112 to a step 114 where the wait task causes an error to be posted. In some embodiments, the error that is provided due a time out is different than the data_not_found result provided in connection with normal operation of the system. Following the step 114 is a step 116 where the DA request allocated at the step 96 of FIG. 4 is deallocated. Following the step 116 is a step 118 where the corresponding RA job, allocated at the step 94 of FIG. 4, is deallocated. Following the step 118, processing is complete.

If it is determined at the step 112 that a time out has not occurred, then control passes from the step 112 to a test step 120 to determine if the disk has been read by, for example, checking an appropriate status location. The step 120 determines if the data request provided to the DA 36 via the DA request allocated at the step 96 of FIG. 4 has been serviced. If it is determined at the test step 120 that the disk has been read, then control flows from the step 120 to the step 116 where the DA request is deallocated. Following the step 116 is the step 118 where the RA job is deallocated. Following the step 118, processing is complete.

Alternatively, if it determined at the step 120 that the disk has not yet been read, then control transfers from the step 120 to a step 122 where the task releases context. In a multitasking environment, a task may release it's context to allow other tasks to run. The step 122 and subsequent path therefrom represents the wait task releasing it's context in a way so that, when the wait task is swapped back in, execution begins at the step 112.

In some embodiments, it may not be possible or desirable to create the separate wait task illustrated above in connection with FIG. 5. In that case, the request for data is provided from the RA 30 to the RA 32 and, if the request cannot be fulfilled immediately, a temporary disconnect occurs. Then, once the data has been read from the volume 34 into the cache portion of the memory 38 of the remote storage device 26, a reconnect occurs and the data is provided from the RA 32 to the RA 30 via the RDF link 29. This mechanism is discussed in more detail below.

Figure 6:
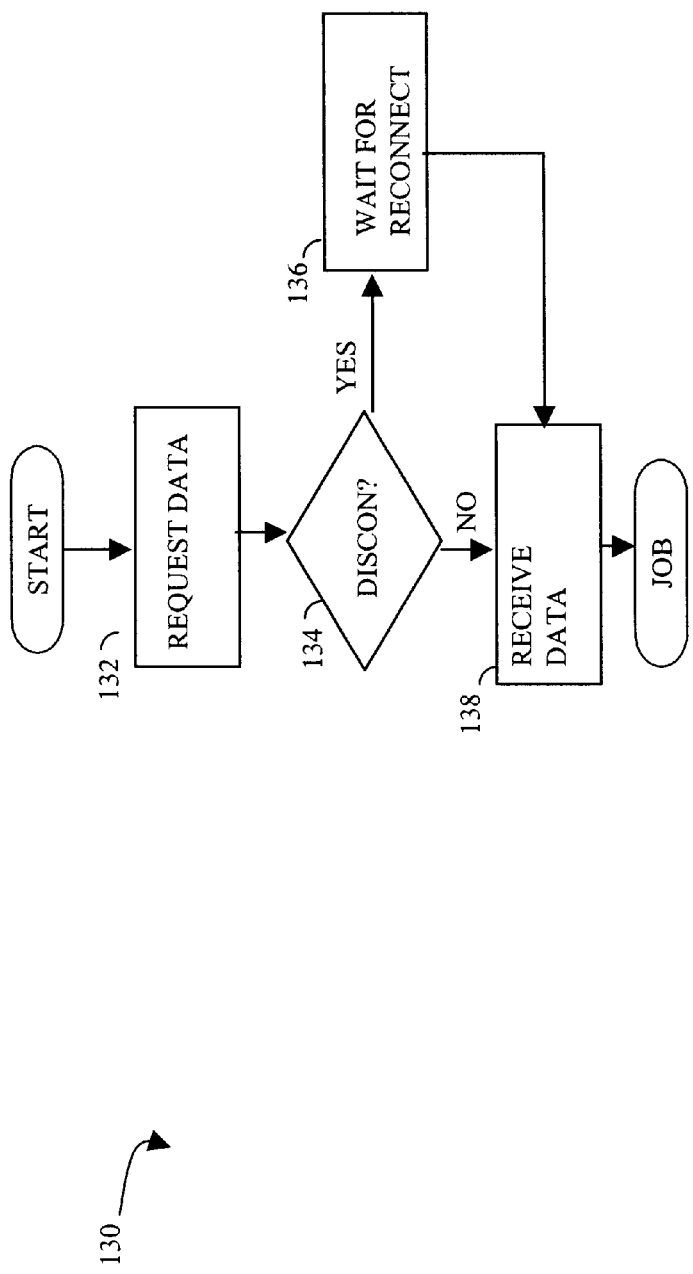
FIG. 6 is a flowchart illustrating steps performed by software running on a requesting RA in connection with an embodiment of the system described herein.

Referring to FIG. 6, a flowchart 120 illustrates steps in connection with requesting data from the volume 34 of the remote storage device 26 in an embodiment where no wait task is used. Processing begins at a first step 132 where the local storage device 24 requests the data from the remote storage device 26 by providing a system call from the RA 30 to the RA 32 via the RDF link 29. Following the step 132 is a test step 134 which determines if a disconnect has occurred. If it is determined at the step 134 that a disconnect has occurred, then control transfers from the step 134 to a step 136 where a wait for a reconnect occurs. A disconnect allows processing for other RDF requests using other devices of the remote storage device 26. Following the step 136 or following the step 134 if no disconnect occurs is a step 138 where the data from the remote storage device 26 is received. Following the step 138, processing is complete.

Figure 7:
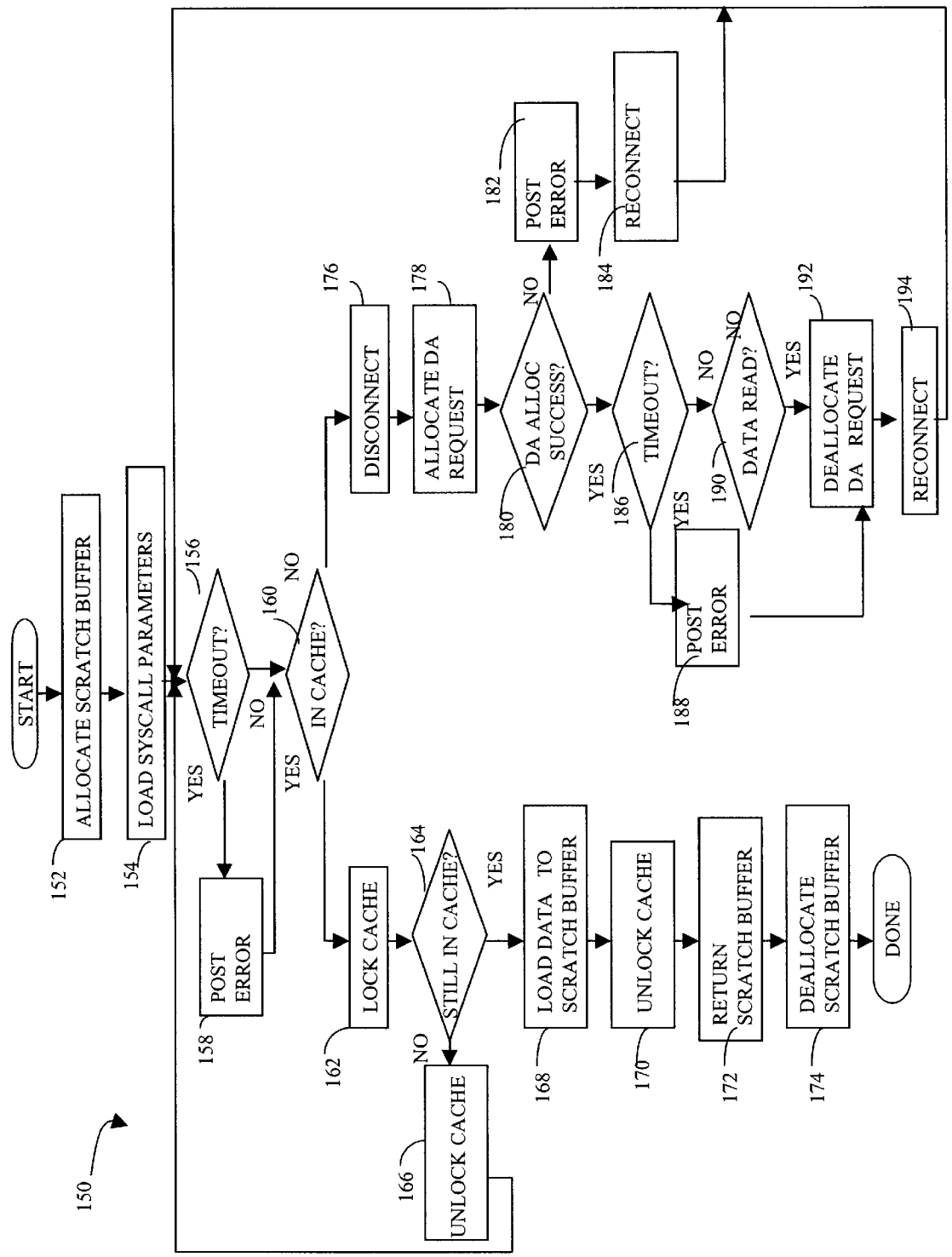
FIG. 7 is a flowchart illustrating steps performed by software running on a remote RA in connection with an embodiment of the system described herein.

Referring to FIG. 7, a flowchart 150 illustrates steps performed by the RA 32 of the remote storage device 26 in connection with a data request system request provided by the local storage device 24 via the RA 30 and the RDF link 29 in an embodiment where a wait task is not created. Processing begins at a first step 152 where a scratch buffer is allocated followed by a step 154 where the parameters from the system call are loaded into the scratch buffer. The steps 152, 154 are analogous to the steps discussed above in connection with the steps 72, 74 of FIG. 4.

Following the step 154 is a test step 156 which determines if a timeout has occurred. A timeout occurs at the step 156 when too much time has elapsed between first invoking the request illustrated by the flowchart 150 and the request being serviced. If it is determined at the step 156 that a timeout has occurred, then control transfers from the step 156 to a step 158 where an error is posted. Following the step 158, or following the step 156 if a timeout has not occurred, is a test step 160 where it is determined if the requested data is in the cache portion of the memory 38. If it is determined at the step 160 that the requested data is in the cache, then control transfers from the step 160 to a step 162 where the cache slot corresponding to the requested data is locked.

Following the step 162 is a test step 164 where it is determined if the requested data is still in the cache. As discussed above, it is possible in a multitasking environment for the data to have been removed from the cache in between the test step 160 and the locking step 162. If it is determined at the step 164 that the data is not still in the cache, then control transfers from the step 164 to a step 166 where the cache slot is unlocked. Following the step, 166, control transfers back to the step 156, discussed above.

If it determined at the step 164 that the data is still in cache, then control transfers from the step 164 to a step 168 where the data from the cache is loaded into the scratch buffer that was allocated at the step 152. Following the step 168 is a step 170 where the cache is unlocked. Following the step 170 is a step 172 where the data (including any appropriate system parameters) is returned to the local storage device using the RA's 30, 32 and the RDF link 29. Following step 172 is a step 174 where the scratch buffer allocated at the step 152 is deallocated. Following step 174, processing is complete.

If it is determined at the step 160 that the data is not in the cache, then control passes from the step 160 to a step 176 where a disconnect occurs. As discussed above, a disconnect allows requests for other devices to be serviced in connection with the RDF link 29. Following the step 176 is a step 178 where a DA request is allocated in a manner similar to that discussed above in connection with FIG. 4. Following the step 178 is a test step 180 where it is determined if the DA allocation at the step 178 was successful. If not, control passes from the step 180 to a step 182 where an error is posted. Following the step 182 is a step 184 where a reconnect occurs. Following the step 184, control flows back to the step 156, discussed above.

If it is determined at the step 180 that the DA request allocation was successful, then control passes from the step 180 to a test step 186 where it is determined if a timeout has occurred. As discussed above in connection with FIG. 5, it may be useful to monitor the time between providing the DA request and the request being serviced. If it is determined at the step 186 that a predetermined amount of time has passed since initiating the request, then control passes from the step 186 to a step 188 where an error is posted. In some embodiments, the predetermined amount of time is eight seconds, although other times may be used.

If it is determined at the step 186 that a timeout has not occurred, then control passes from the step 186 to a step 190 where it is determined if the requested data has been read off the volume 34 by, for example, monitoring appropriate status. If it is determined at the step 190 that the data has not been read, then control passes from the step 190 to a step 192 where the DA request that was allocated at the step 178 is deallocated. Note that the step 192 also follows the step 188. Following the step 102 is a step 194 where a reconnect occurs. Following the step 194, controls flows back to the step 156. Note, however, that at this point, the data would be expected to now be in the cache portion of the memory 38.

In some instances, it may not be desirable to perform a disconnect and a subsequent reconnect, as discussed above. In those cases, the steps 176, 184, 194 may be omitted.

Note that for the system disclosed herein, the host 22 may be a standalone computing device, part of a network, another storage device, a computer having some storage capabilities and/or any device capable of providing the functionality disclosed herein. Similarly, the system disclosed herein may be practiced with any appropriate device used for the local storage device 24, including possibly another computing device, network connection, etc. configured to emulate the local storage device 24 and/or otherwise provide the functionality disclosed herein.

While the invention has been disclosed in connection with various embodiments, modifications thereon will be readily apparent to those skilled in the art. Accordingly, the spirit and scope of the invention is set forth in the following claims.

What is claimed is:

1. A method of providing data from a volume of a remote storage device coupled to a local storage device that is coupled to a host, the method comprising:
   providing a command to the remote storage device to request the data;
   if the data is stored in a cache portion of the remote storage device, the remote storage device providing the data;
   if the data is not stored in the cache portion of the remote storage device, the remote storage device causing the data to be fetched from the volume and disconnecting from said local storage device; and
   after the data has been fetched from the volume, the remote storage device providing a reconnect command followed by the data.

2. A method, according to claim 1, wherein causing the data to be fetched from the volume includes providing a request for the data on a queue that is serviced by a disk adapter corresponding to the volume.

3. A method, according to claim 1, wherein the data is provided from the remote storage device to the local storage device.

4. A method, according to claim 3, further comprising:
   the local storage device providing the data to the host.

5. A method, according to claim 1, wherein providing a command to the remote storage device includes transmitting a command from the local storage device to the remote storage device.

6. A method, according to claim 5, further comprising:
   prior to the local storage device providing the command to the remote storage device, the host providing the command to the local storage device.

7. A method, according to claim 1, wherein an error is posted if the data is not fetched after a predetermined amount of time.

8. A method of providing data from a volume of a remote storage device coupled to a local storage device that is coupled to a host, the method comprising:
   providing a command to the remote storage device to request the data;
   if the data is stored in a cache portion of the remote storage device, the remote storage device providing the data;
   if the data is not stored in the cache portion of the remote storage device, the remote storage device causing the data to be fetched from the volume and disconnecting from said local storage device; and
   in response to the data being in the cache portion of the remote storage device, locking the cache portion prior to transferring data therefrom.

9. A method, according to claim 8, further comprising:
   following locking the cache portion, retesting to determine if the data is still stored in the cache portion; and
   in response to retesting indicating that the data is not in the cache portion, the remote storage device unlocking the cache portion and then causing the data to be fetched from the volume and performing a disconnect operation.

10. A method, according to claim 8, further comprising:
    following transferring the data from the cache portion, unlocking the cache portion.

11. A method of retrieving data, comprising:
    providing a command to a remote storage device containing the data;
    receiving one of: the data or an indicator that the data is not available, wherein following receipt of the indicator, the data becomes available at the remote storage device after an amount of time that corresponds to retrieving the data from a disk of the remote storage device;
    in response to the data not being available in cache memory of the remote storage device, causing the data to be fetched from the disk; and
    after the data has been fetched from the disk, the remote storage device providing a reconnect command followed by the data.

12. A method, according to claim 11, further comprising:
    the remote storage device retrieving data by providing a request for the data on a queue that is serviced by a disk adapter corresponding to the disk.

13. A method, according to claim 11, wherein providing a command to a remote storage device includes:
    providing the command to a local storage device; and
    the local storage device providing the command to the remote storage device.

14. A method of retrieving data, comprising:
providing a command to a remote storage device containing the data;
receiving one of: the data or an indicator that the data is not available, wherein following receipt of the indicator, the data becomes available at the remote storage device after an amount of time that corresponds to retrieving the data from a disk of the remote storage device; and
in response to the data being in the cache portion of the remote storage device, locking the cache portion prior to transferring data therefrom.

15. A method, according to claim 14, further comprising:
following locking the cache portion, retesting to determine if the data is still stored in the cache portion; and
in response to retesting indicating that the data is not in the cache portion, the remote storage device unlocking the cache portion and then causing the data to be fetched from the disk and performing a disconnect operation.

16. A method, according to claim 14, further comprising:
following transferring the data from the cache portion, unlocking the cache portion.

17. A method, according to claim 14, further comprising:
in response to the data not being available in cache memory of the remote storage device, causing the data to be fetched from the disk.

18. A method, according to claim 17, wherein causing the data to be fetched from the disk includes providing a request for the data on a queue that is serviced by a disk adapter corresponding to the disk.

19. A method, according to claim 17, wherein an error is posted if the data is not fetched after a predetermined amount of time.

20. A method, according to claim 19, wherein the predetermined amount of time is eight seconds.

21. Computer software that provides data from a volume of a remote storage device, comprising:
executable code that receives a command sent to the remote storage device to request the data;
executable code that provides the data if the data is stored in a cache portion of the remote storage device;
executable code that causes the data to be fetched from the volume and returns a disconnect if the data is not stored in the cache portion of the remote storage device; and
executable code that provides a reconnect command followed by the data after the data has been fetched from the volume.

22. Computer software, according to claim 21, wherein executable code that causes the data to be fetched from the volume includes executable code that provides a request for the data on a queue that is serviced by a disk adapter corresponding to the volume.

23. Computer software, according to claim 21, wherein an error is posted if the data is not fetched after a predetermined amount of time.

24. Computer software, according to claim 23, wherein the predetermined amount of time is eight seconds.

25. Computer software that provides data from a volume of a remote storage device, comprising:
executable code that receives a command sent to the remote storage device to request the data;
executable code that provides the data if the data is stored in a cache portion of the remote storage device;
executable code that causes the data to be fetched from the volume and returns a disconnect if the data is not stored in the cache portion of the remote storage device; and
executable code that locks the cache portion prior to transferring data therefrom in response to the data being in the cache portion of the remote storage device.

26. Computer software, according to claim 25, further comprising:
executable code that retests to determine if the data is still stored in the cache portion following locking the cache portion; and
executable code that unlocks the cache portion, causes the data to be fetched from the volume, and returns a disconnect in response to retesting indicating that the data is not in the cache portion.

27. Computer software, according to claim 25, further comprising:
executable code that unlocks the cache portion following transferring the data from the cache portion.

28. A remote storage device, comprising:
a disk;
a cache memory in communication with said disk;
means for receiving requests for data stored on said disk;
means for providing requested data if the requested data is also stored in said cache memory; and
means for causing the data to be fetched from said disk and providing a disconnect if the requested data is not stored in said cache memory
means for providing a reconnect command followed by the data after the data has been fetched from said disk.

29. A remote storage device, according to claim 28, wherein means for causing the data to be fetched from said disk includes means for providing a request for the data on a queue that is serviced by a disk adapter corresponding to said disk.

30. A remote storage device, according to claim 28, wherein the data is provided from the remote storage device to a local storage device.

31. A remote storage device, according to claim 28, wherein the data is provided to a host.

32. A remote storage device, according to claims 28, wherein an error is posted if the data is not fetched after a predetermined amount of time.

33. A remote storage device, according to claim 32, wherein the predetermined amount of time is eight seconds.

34. A remote storage device, comprising:
a disk;
a cache memory in communication with said disk;
means for receiving requests for data stored on said disk;
means for providing requested data if the requested data is also stored in said cache memory;
means for causing the data to be fetched from said disk and providing a disconnect if the requested data is not stored in said cache memory; and
means for locking said cache memory prior to transferring data therefrom in response to the data being in said cache memory.

35. A remote storage device, according to claim 34, further comprising:
means for retesting to determine if the data is still stored in said cache memory following locking said cache memory; and
means for unlocking said cache memory and then causing the data to be fetched from the disk and returning a disconnect in response to retesting indicating that the data is not in said cache memory.

36. A remote storage device, according to claim 34, further comprising:

means for unlocking said cache memory following transferring the data from said cache memory.

37. A method of providing data from a remote storage device, comprising:
   providing a command to the remote data storage device to request the data using a connection between a local storage device and said remote storage device;
   determining whether the data is stored in a cache portion of the remote data storage device;
   if the data is stored in the cache portion of the remote storage device, providing the data by the remote data storage device;
   if the data is not stored in the cache portion indicating that there is a cache miss, the remote storage device causing the data to be fetched and placed in said cache portion and disconnecting the connection with the local storage device and
   after the data has been fetched, the remote data storage device providing a reconnect command followed by the data.

38. The method of claim 37, further comprising:
   if there is a cache miss, said local storage device issuing another request for the data using another connection between said local storage device and said remote storage device.

39. The method of claim 37, wherein, upon said connection being disconnected by said remote storage device, using said connection to request other data from said remote storage device.

40. The method of claim 37, wherein, upon said connection being disconnected by said remote storage device, using said connection to request other data from another storage device coupled to said local storage device.

41. The method of claim 37, wherein said connection is in use and unavailable for other data operations until an occurrence of one of: said data is returned to said local storage device by said remote storage, and said remote storage device performs a disconnect of said connection.

42. The method of claim 37, further comprising:
   providing said data to said local storage device.

43. The method of claim 42, further comprising:
   providing said data by said local storage device to a host coupled to said local storage device.

44. The method of claim 43, further comprising:
   providing a command by said host computer to said local storage device requesting the data.

45. The method of claim 44, further comprising:
   providing a command by said local storage device to said remote storage device requesting the data.

* * * * *